United States Patent
Chung

(10) Patent No.: US 11,416,426 B2
(45) Date of Patent: Aug. 16, 2022

(54) MEMORY DEVICE AND METHOD OF OPERATING THE SAME

(71) Applicant: SK hynix Inc., Icheon-si (KR)

(72) Inventor: Seung Hyun Chung, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 0 days.

(21) Appl. No.: 16/952,710

(22) Filed: Nov. 19, 2020

(65) Prior Publication Data

US 2021/0390065 A1 Dec. 16, 2021

(30) Foreign Application Priority Data

Jun. 15, 2020 (KR) .................. 10-2020-0072471

(51) Int. Cl.
| | | |
|---|---|---|
| *G06F 13/16* | (2006.01) | |
| *G06F 12/02* | (2006.01) | |
| *G06F 13/12* | (2006.01) | |
| *G06F 9/30* | (2018.01) | |
| *G06F 11/30* | (2006.01) | |

(52) U.S. Cl.
CPC ...... *G06F 13/1668* (2013.01); *G06F 9/30101* (2013.01); *G06F 11/3037* (2013.01); *G06F 12/0238* (2013.01); *G06F 13/126* (2013.01)

(58) Field of Classification Search
CPC ............. G06F 13/1668; G06F 9/30101; G06F 11/3037; G06F 12/0238; G06F 13/126
USPC ........................................................ 711/154
See application file for complete search history.

(56) References Cited

U.S. PATENT DOCUMENTS

| | | | | |
|---|---|---|---|---|
| 5,365,485 A | * | 11/1994 | Ward | G06F 5/06 |
| | | | | 365/189.15 |
| 6,098,139 A | * | 8/2000 | Giacobbe | G06F 5/10 |
| | | | | 710/58 |
| 8,732,440 B2 | * | 5/2014 | Jacobs | G06F 9/30054 |
| | | | | 712/224 |
| 10,650,908 B2 | * | 5/2020 | Jung | G11C 29/40 |
| 2008/0212983 A1 | * | 9/2008 | Park | G03G 15/6529 |
| | | | | 399/18 |
| 2009/0172496 A1 | * | 7/2009 | Roine | H03M 13/451 |
| | | | | 714/758 |
| 2011/0176372 A1 | * | 7/2011 | Baba | G06F 13/4239 |
| | | | | 365/189.05 |

(Continued)

FOREIGN PATENT DOCUMENTS

| | | |
|---|---|---|
| KR | 1020110078734 A | 7/2011 |
| KR | 1020190066844 A | 6/2019 |

*Primary Examiner* — Christopher B Shin
(74) *Attorney, Agent, or Firm* — William Park & Associates Ltd.

(57) ABSTRACT

A memory device includes an input/output circuit configured to receive a status read command from a memory controller, a toggle counter configured to count a number of toggles of a signal received from the memory controller, and a status register configured to store status information of the memory device and configured to output the status information to the input/output circuit. The memory device also includes a status output controller configured to determine whether the number of toggles counted by the toggle counter corresponds to a reference number of toggles and configured to control the status register to transmit the status information to the memory controller through the input/output circuit, in response to the status read command.

20 Claims, 8 Drawing Sheets

(56) References Cited

U.S. PATENT DOCUMENTS

| | | | |
|---|---|---|---|
| 2013/0252454 A1* | 9/2013 | Zahler | A61B 1/00128 439/358 |
| 2013/0254454 A1* | 9/2013 | Ide | G06F 3/0688 711/5 |
| 2015/0170722 A1* | 6/2015 | Yun | G11C 7/1048 365/194 |
| 2015/0221354 A1* | 8/2015 | Palmer | G06F 13/1689 365/193 |
| 2016/0078968 A1* | 3/2016 | Park | G11C 17/18 365/96 |
| 2016/0098504 A1* | 4/2016 | Larzul | G06F 30/367 716/136 |
| 2016/0111140 A1* | 4/2016 | Joo | G11C 11/40611 365/222 |
| 2016/0239373 A1* | 8/2016 | Shah | G06F 11/0793 |
| 2016/0365127 A1* | 12/2016 | Chun | G11C 7/1093 |
| 2017/0110175 A1* | 4/2017 | Kim | G11C 11/4096 |
| 2018/0076790 A1* | 3/2018 | Kojo | H03H 9/02015 |
| 2019/0051336 A1* | 2/2019 | Kim | G11C 7/22 |
| 2019/0325976 A1* | 10/2019 | Ko | G11C 7/12 |

\* cited by examiner

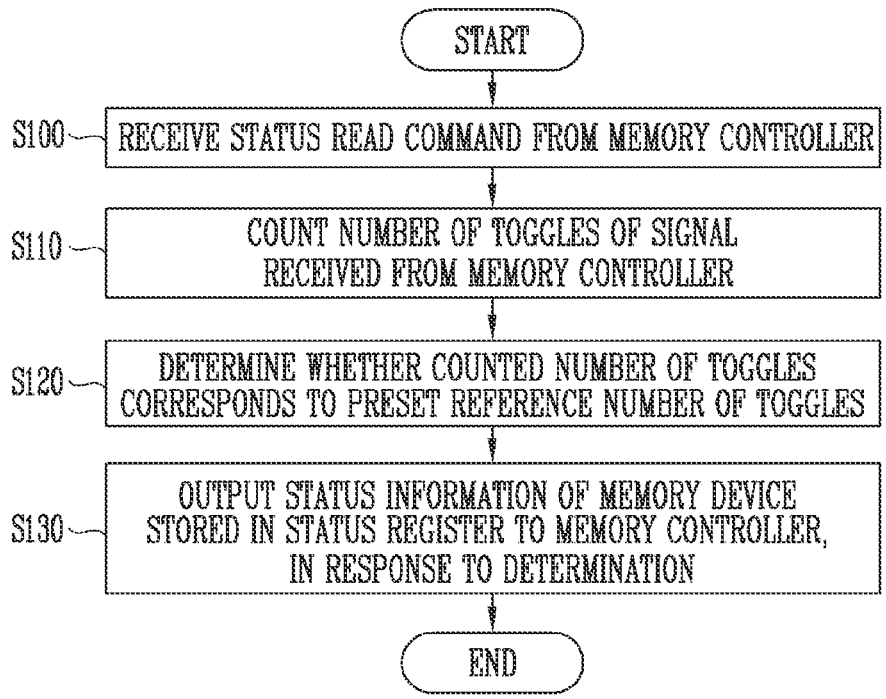
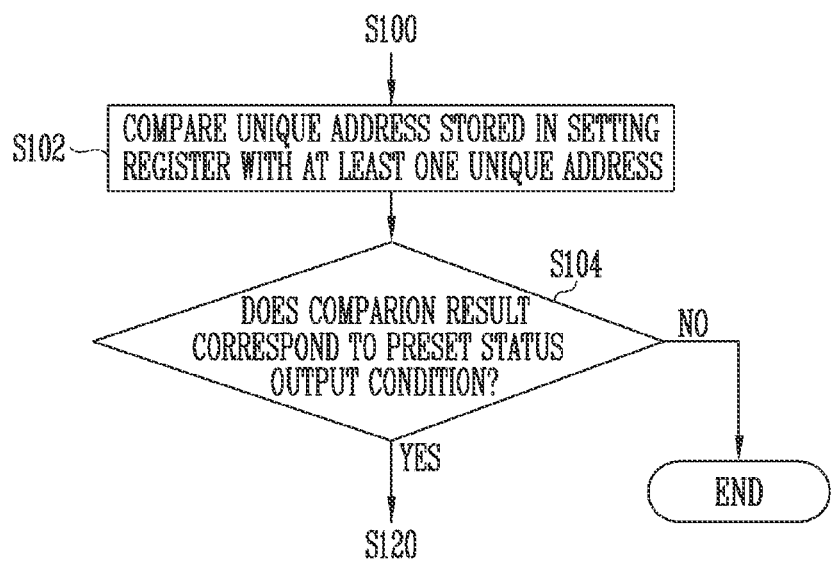

MEMORY DEVICE AND METHOD OF OPERATING THE SAME

CROSS-REFERENCE TO RELATED APPLICATION

The present application claims priority under 35 U.S.C. § 119(a) to Korean patent application number 10-2020-0072471, filed on Jun. 15, 2020, in the Korean Intellectual Property Office, the entire disclosure of which is incorporated herein by reference.

BACKGROUND

1. Technical Field

The present disclosure relates to a memory device, and more particularly, to a memory device and a method of operating the same.

2. Related Art

A storage device is a device that stores data under the control of a host device such as a computer or a smartphone. The storage device may include a memory device in which data is stored and a memory controller controlling the memory device. The memory device may be a volatile memory device or a non-volatile memory device.

A volatile memory device is a memory device that stores data only when power is supplied and loses the stored data when the power supply is cut off. Volatile memory devices, for example, include static random access memory (SRAM), dynamic random access memory (DRAM), and the like.

A non-volatile memory device is a memory device that does not lose data even when power is cut off. Non-volatile memory devices, for example, include read only memory (ROM), programmable ROM (PROM), electrically programmable ROM (EPROM), electrically erasable and programmable ROM (EEPROM), flash memory, and the like.

SUMMARY

An embodiment of the present disclosure is directed to a memory device capable of efficiently performing a status read on a plurality of memory chips and a method of operating the same.

A memory device according to an embodiment may include an input/output circuit configured to receive a status read command from a memory controller, a toggle counter configured to count a number of toggles of a signal received from the memory controller, and a status register configured to store status information of the memory device and configured to output the status information to the input/output circuit. The memory device may also include a status output controller configured to determine whether the number of toggles counted by the toggle counter corresponds to a reference number of toggles, and configured to control the status register to transmit the status information to the memory controller through the input/output circuit, in response to the status read command.

A method of operating a memory device according to an embodiment may include receiving a status read command from a memory controller, counting the number of toggles of a signal received from the memory controller in response to the status read command, and determining whether the counted number of toggles corresponds to a preset reference number of toggles. The method may also include outputting status information of the memory device stored in a status register to the memory controller, in response to the determination.

BRIEF DESCRIPTION OF THE DRAWINGS

FIG. 10 is a flowchart illustrating a method of operating the memory device according to an embodiment.

FIG. 11 is a flowchart supplementing the operation method according to FIG. 10.

DETAILED DESCRIPTION

Specific structural or functional descriptions of embodiments according to the concept disclosed in the present specification or application are illustrated only to describe the embodiments according to the concept of the present disclosure. The embodiments according to the concept of the present disclosure may be carried out in various forms and the descriptions are not limited to the embodiments described in the present specification or application.

Figure 1:
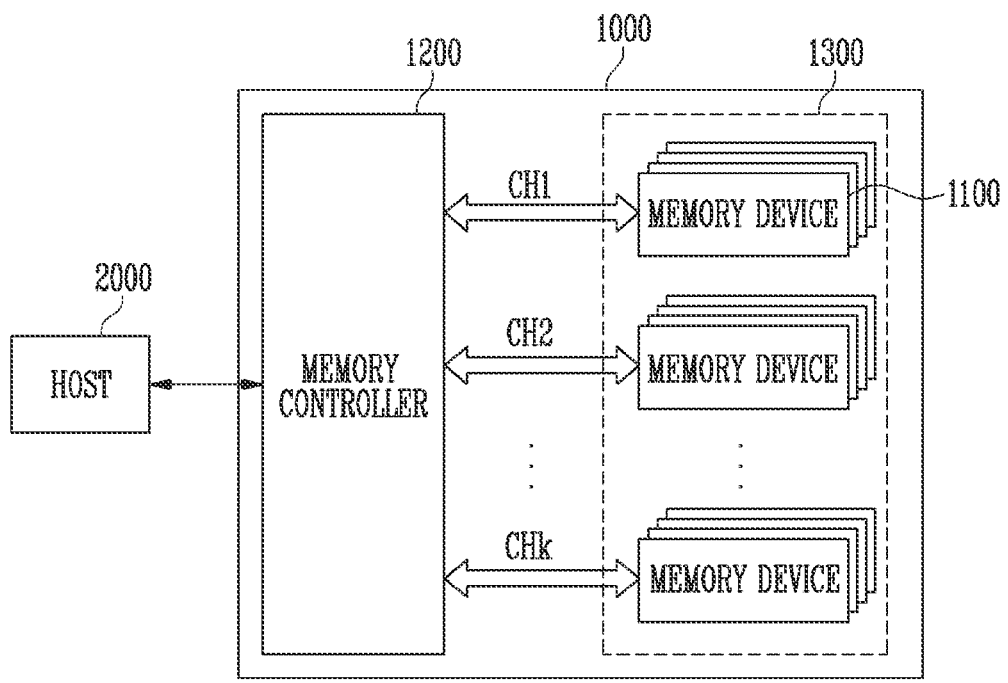
FIG. 1 is a diagram of a memory system, according to an embodiment.

FIG. 1 is a diagram for describing a memory system according to an embodiment.

Referring to FIG. 1, the memory system 1000 may include a memory device 1100 in which data is stored, and a memory controller 1200 that controls the memory device 1100 according to a request of a host 2000.

The host 2000 may communicate with the memory system 1000 using at least one of various communication methods such as a universal serial bus (USB), a serial AT attachment (SATA), a serial attached SCSI (SAS), a high speed interchip (HSIC), a small computer system interface (SCSI), a peripheral component interconnection (PCI), a PCI express (PCIe), a nonvolatile memory express (NVMe), a universal flash storage (UFS), a secure digital (SD), a multimedia card (MMC), an embedded MMC (eMMC), a dual in-line memory module (DIMM), a registered DIMM (RDIMM), and a load reduced DIMM (ILRDIMM).

The memory device 1100 may be implemented as a volatile memory device in which data is lost when supplied power is cut off or a non-volatile memory device in which data is maintained even when supplied power is cut off. The memory device 1100 may perform a program operation, a read operation, or an erase operation under control of the memory controller 1200. For example, during the program operation, the memory device 1100 may receive a command, an address, and data from the memory controller 1200 and perform the program operation. During the read operation, the memory device 1100 may receive a command and an address from the memory controller 1200, and output read data to the memory controller 1200. The memory device 1100 may be referred to as a chip or a die as an individual integrated chip (IC) of which an element process is ended.

The memory system 1000 may include memory device groups 1300 in which a plurality of memory devices 1100 are grouped, and the memory devices 1100 belonging to each of the memory device groups 1300 may communicate with the memory controller 1200 through respective channels CH1 to CHk. Hereinafter, for convenience of description, it is assumed that four memory devices are included in one memory device group connected to one channel, but the present disclosure is not limited thereto.

The memory controller 1200 may control an overall operation of the memory system 1000 and control the data exchange between the host 2000 and the memory device 1100. For example, when a command is received from the host 2000, the memory controller 1200 may control the respective memory device groups 1300 of the memory devices 1100 connected to the respective channels CH1 to CHk according to the received command. The memory controller 1200 may control the memory devices 1100 included in the memory device groups 1300 connected to respective channels according to the request of the host 2000 to program, read, or erase data. In addition, the memory controller 1200 may receive data and a logical address from the host 2000, and convert the logical address into a physical address indicating an area in which data is actually stored in the memory device 1100. In addition, the memory controller 1200 may store a logical-to-physical address mapping table configuring a mapping relationship between the logical address and the physical addresses in a buffer memory (not shown).

The memory controller 1200 may perform a status read operation for grasping a status of at least one of the memory devices 1100 before or during control of a specific operation of the memory devices 1100. For example, the memory controller 1200 may transmit a status read command to the memory devices 1100, and at least one of the memory devices 1100 may output status information to the memory controller 1200 in response to the status read command. In addition, the memory controller 1200 may transmit the status read command to the memory devices 1100 to monitor whether a previously issued command is completed, FIG. 2 is a diagram for describing signals exchanged between the memory controller and the memory device according to FIG. 1.

Figure 2:
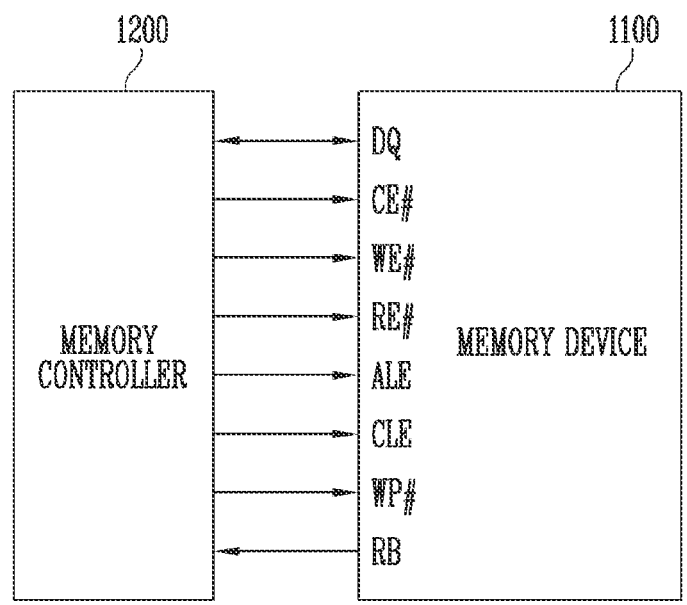
FIG. 2 is a diagram showing signals exchanged between a memory controller and a memory device according to FIG.

Referring to FIG. 2, the memory controller 1200 and the memory device 1100 may exchange a command, data, and/or an address with each other through an input/output pad DQ. For example, the input/output pad DQ may be configured of eight lines to transmit and receive data of 8 bits, and each line may transmit and receive data of 1 bit.

The memory device 1100 may receive a chip enable signal through a CE #pad, receive a write enable signal through a WE #pad, receive a read enable signal through an RE #pad, receive an address latch enable signal through an ALE pad, receive a command latch enable signal through a CLE pad, and receive a write protection signal through a WP #pad.

The address latch enable signal may be a signal instructed by the memory controller 1200 to the memory device 1100 so that the memory device 1100 loads the address provided to the memory device 1100 through the input/output pad DQ in an address register. The chip enable signal may be a signal instructed by the memory controller 1200 to the memory device 1100 to enable or disable one or more memory devices. The command latch enable signal may be a signal instructed by the memory controller 1200 to the memory device 1100 so that the memory device 1100 loads the command provided to the memory device 1100 through the input/output pad DQ in a command register. The read enable signal may be a signal instructed by the memory controller 1200 to the memory device 1100 so that the memory device 1100 transmits the data to the memory controller 1200. The write enable signal may be a signal informing that the command, the address, and the data are transferred.

The memory device 1100 may output a ready-busy signal to the memory controller 1200 through an RB pad. The ready-busy signal may indicate whether a memory array of the memory device 1100 is in an active status, FIG. 2 shows a connection relationship between one memory device 1100 and the memory controller 1200. However, the input/output pad DQ, the CE #pad, the WE #pad, the RE #pad, the ALE pad, the CLE pad, the WP #pads may form one channel, and the memory controller 1200 and one of the memory device groups 1300 may be connected through the formed channel. For example, one of the memory device groups 1300 may be connected to the CE #pad.

Therefore, when the memory controller 1200 transmits the command, the data, and/or the address through the input/output pad DQ included in one channel, all of the memory devices 1100 connected to the corresponding channel or a memory device 1100 selected among the memory devices 1100 connected to the corresponding channel may receive the command, the data, and/or the address. For example, the memory controller 1200 may transmit the status read command to the memory devices 1100 connected to the corresponding input/output pad DQ through the input/output pad DQ, and at least one of the memory devices 1100 receiving the status read command may transmit the status information to the input/output pad DQ in response to the status read command.

Figure 3:
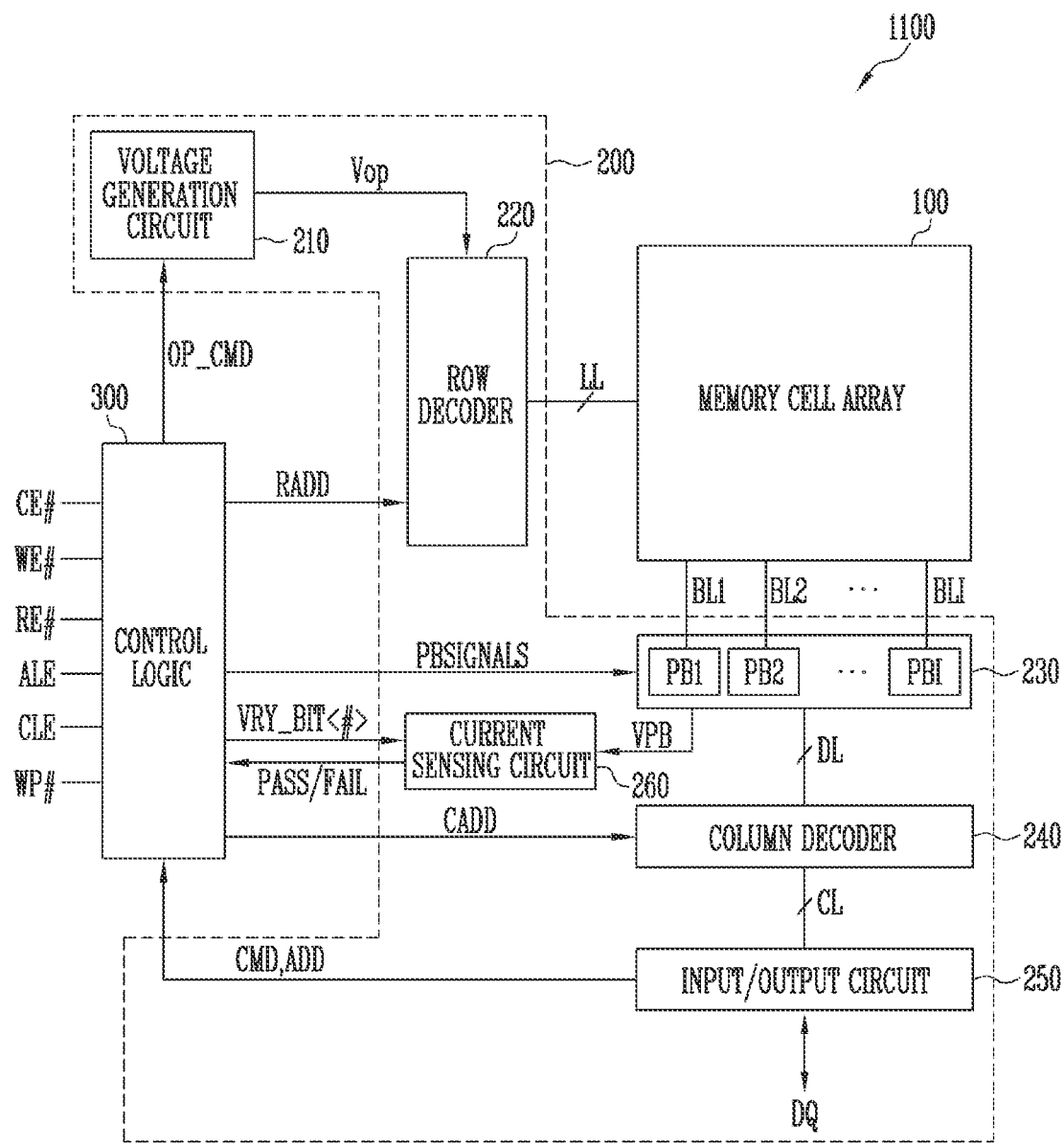
FIG. 3 is a diagram of the memory device of FIG. 1.

FIG. 3 is a diagram for specifically describing the memory device of FIG. 1.

Referring to FIG. 3, the memory device 1100 may be implemented as a volatile memory device or a non-volatile memory device. In FIG. 3, a non-volatile memory device is shown as an embodiment, but the present embodiment is not limited to the non-volatile memory device.

The memory device 1100 may include a memory cell array 100 in which data is stored. The memory device 1100 may include peripheral circuits 200 configured to perform a program operation for storing data in the memory cell array 100, a read operation for outputting the stored data, and an erase operation for erasing the stored data. The memory device 1100 may include control logic 300 that controls the peripheral circuits 200 under control of the memory controller 1200.

The memory cell array 100 includes a plurality of memory cells in which data is stored. For example, the memory cell array 100 may include at least one plane, the plane may include one or more memory blocks. In an embodiment, the plane may be a unit of a memory area accessed when the program, read, or erase operation is performed. Each of the memory blocks may include a plurality of memory cells. A structure including a plurality of planes may be referred to as a multi-plane structure. User data and information necessary for an operation of the memory device 1100 may be stored in the memory blocks. The memory blocks may be implemented in a two-dimensional or three-dimensional structure. The memory blocks having the two-dimensional structure may include memory cells arranged parallel to a substrate, and the memory blocks having the three-dimensional structure may include memory cells stacked vertically on the substrate.

The peripheral circuits 200 may be configured to perform the program, read, and erase operations according to the control of the control logic 300. For example, the peripheral circuits 200 may include a voltage generation circuit 210, a row decoder 220, a page buffer group 230, a column decoder 240, an input/output circuit 250, and a current sensing circuit 260.

The voltage generation circuit 210 may generate various operation voltages Vop used for the program, read, and erase operations, in response to an operation signal OP_CMD output from the control logic 300. For example, the voltage generation circuit 210 may generate various voltages, such as a program voltage, a verify voltage, a pass voltage, a read voltage, and an erase voltage, under the control of the control logic 300.

The row decoder 220 may supply the operation voltages Vop to local lines LL connected to a selected memory block among the memory blocks of the memory cell array 100, in response to a row address RADD output from the control logic 300. The local lines LL may include local word lines, local drain select lines, and/or local source select lines. In addition, the local lines LL may include various lines connected to the memory block, such as a source line.

The page buffer group 230 may be connected to bit lines BL1 to BLI connected to the memory blocks of the memory cell array 100. The page buffer group 230 may include a plurality of page buffers PB1 to PBI connected to the bit lines BL1 to BLI. The page buffers PB1 to PBI may operate in response to page buffer control signals PBSIGALS output from the control logic 300. For example, the page buffers PB1 to PBI may temporarily store data received through the bit lines BL1 to BLI, or may sense a voltage or a current of the bit lines BL1 to BLI during the read operation or a verify operation.

The column decoder 240 may transfer data between the input/output circuit 250 and the page buffer group 230 in response to a column address CADD output from the control logic 300. For example, the column decoder 240 may exchange data with the page buffers PB1 to PBI through data lines DL, or exchange data with the input/output circuit 250 through column lines CL.

The input/output circuit 250 may receive a command CMD, an address ADD, and data from the memory controller 1200 through the input/output pad DQ, and output data read from the memory cell array 100 to the memory controller 1200 through the input/output pad DQ. For example, the input/output circuit 250 may transfer the command CMD and the address ADD received from the memory controller 1200 to the control logic 300 or exchange data DATA with the column decoder 240.

During the read operation or the verify operation, the current sensing circuit 260 may generate a reference current in response to a permission bit VRY_BIT<#>, compare a sensing voltage VPB received from the page buffer group 230 with a reference voltage generated by the reference current, and output a pass signal PASS or a fail signal FAIL.

The control logic 300 may receive the command CMD and the address ADD in response to the signals received through the CE #, WE #, RE #, ALE, CLE, and WP #pads. The control logic 300 may generate control signals for controlling the peripheral circuits 200 in response to receiving the command CMD and the address ADD, and output the generated control signals to the peripheral circuits 200. For example, the control signals may include at least one of the operation signal OP_CMD, the row address RADD, the page buffer control signals PBS IGNALS, and the permission bit VRY_BIT<#>. The control logic 300 may output the operation signal OP_CMD to the voltage generation circuit 210, output the row address RADD to the row decoder 220, output the page buffer control signals PBSIGNALS to the page buffer group 230, and output the permission bit VRY_BIT<#> to the current sensing circuit 260. In addition, the control logic 300 may determine whether the verify operation is passed or failed in response to the pass signal PASS or the fail signal FAIL.

For example, the control logic 300 may receive the status read command received from the memory controller 1200 through the input/output pad DQ from the input/output circuit 250, and may count the number of toggles of a read enable signal received through the RE #pad in response to the status read command. In addition, the control logic 300 may determine whether a counted value corresponds to a preset counting number, and output status information stored in the status register to the memory controller 1200 in response to the determination. The control logic 130 may be implemented as hardware, software, or a combination of hardware and software. For example, the control logic 130 may be a control logic circuit operating in accordance with an algorithm and/or a processor executing control logic code.

Figure 4:
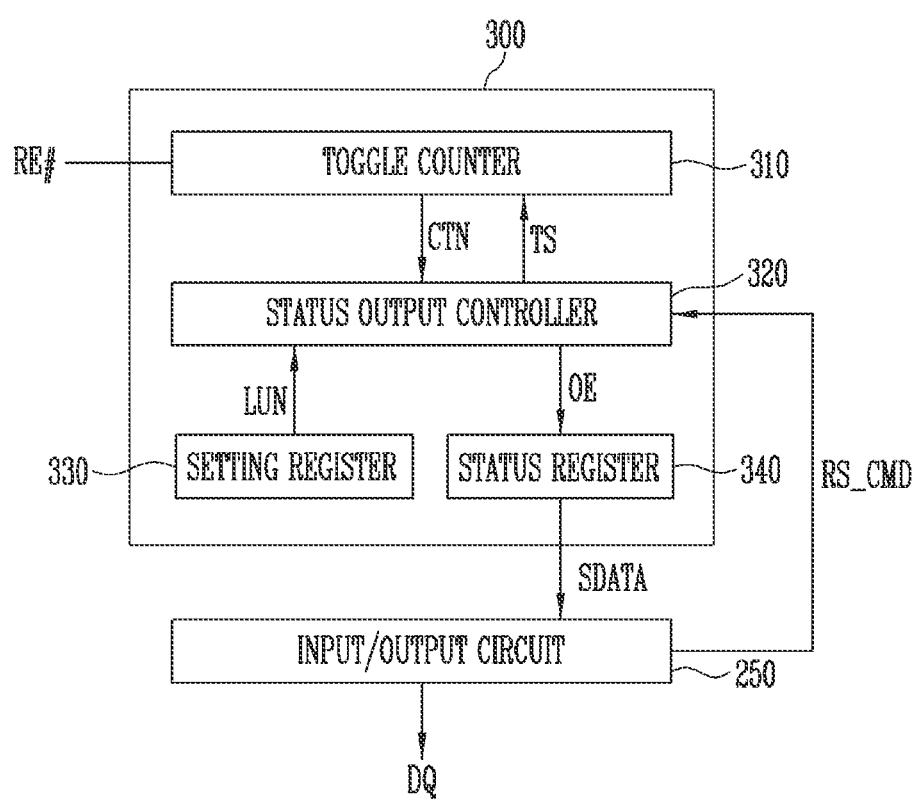
FIG. 4 is a block diagram showing a configuration of the control logic of FIG. 3.

FIG. 4 is a block diagram showing a configuration of the control logic 300 of FIG. 3, according to an embodiment.

Referring to FIG. 4, the control logic 300 may include a toggle counter 310, a status output controller 320, and a status register 340.

The toggle counter 310 may count the number of toggles of a signal received through a pad connected to the memory controller 1200. For example, the toggle counter 310 may count the number of toggles of the read enable signal received through the RE #pad connected to the memory controller 1200, and provide the counted number of toggles CTN to the status output controller 320.

The status register 340 may store status information SDATA of the memory device 1100 controlled by the control logic 300. For example, the status information SDATA may include information on at least one of whether write protection of the memory device 1100 is activated, ready-busy or not of the memory device 1100 (for example, whether or not receiving and processing a new command, address, or data), ready-busy or not of at least one of planes included in the memory device 1100, or whether an operation according to the command received before receiving the status read command has failed. For example, the status register 340 may store status information of 8 bits corresponding to the input/output pad DQ.

A setting register 330 may store setting information allocated to the current memory device 1100. For example, the setting information may Include a unique address LUN and/or a status output condition given to the memory device so that the memory device may be distinguished from another memory device in the memory device group connected to one channel. Here, the status output condition may include the reference number of toggles, and the reference number of toggles may be determined as the number corresponding to the unique address LUN. For example, when the unique address LUN indicates an address of a first memory device in the memory device group connected to one channel, the reference number of toggles may be determined as 1, and when the unique address LUN indicates an address of a second memory device in the memory device group connected to one channel, the reference number of toggles may be determined as 2. Here, the reference number of toggles might not be stored in the setting register 330. For example, the status output controller 320 may determine the reference number of toggles based on the unique address LUN.

When the status output controller 320 receives a status read command RS_CMD from the input/output circuit 250, the status output controller 320 may transmit a trigger signal TS instructing the toggle counter 310 to count the number of toggles to operate (or enable) the toggle counter 310, and receive the number of toggles CTN from the toggle counter 310. In addition, the status output controller 320 may determine whether the number of toggles CTN output from the toggle counter 310 corresponds to (or is equal to) the reference number of toggles based on the setting information provided from the setting register 330. When the number of toggles CTN corresponds to (or s equal to) the reference number of toggles, an output of the status register 340 may be enabled. For example, the status output controller 320 may transmit an output enable signal OE instructing to output the status information stored in the status register 340 to the status register 340, the status register 340 may transmit the status information to the input/output circuit 250 in response to the output enable signal OE, and the input/output circuit 250 may transmit the status information to the memory controller 1200. In other words, the status output controller 320 may control the status register 340 to transmit the status information stored in the status register 340 to the memory controller 1200 through the input/output circuit 250.

Meanwhile, the setting register 330 and the status register 340 are not necessarily implemented separately, and may be integrated into one register form.

Figure 5:
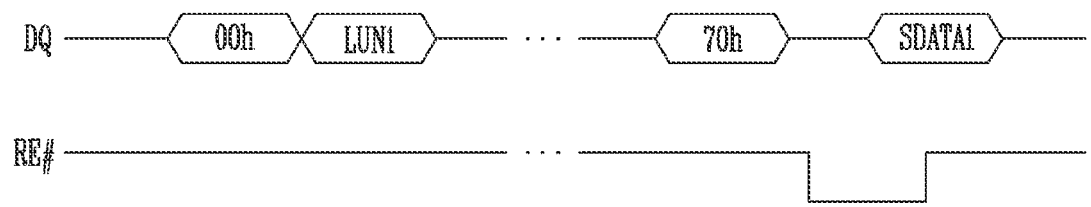
FIG. 5 is a waveform diagram illustrating an operation between the memory controller and the memory device to describe a status read command according to an embodiment.

FIG. 5 is a waveform diagram illustrating an operation between the memory controller and the memory device to describe the status read command according to an embodiment.

When one memory device 1100 is connected to the memory controller 1200, it may be possible to return status information for the memory device by receiving the status read command. However, as shown in FIG. 1, when a plurality of memory device groups 1300 are connected to the memory controller 1200, it is required to select the memory device 1100 to read the status information among the memory devices 1100 included in the memory device groups 1300.

As a first status read command 70h that may avoid the selection of the memory device 1100, the first status read command 70h may be issued from the memory controller 1200 after an operation command for a single memory device 1100. For example, the memory controller 1200 may perform a page read operation on the first memory device by outputting a page read command 00h and a unique address LUN1 of the first memory device through an input/output pad DQ, and may output the first status read command 70h through the input/output pad DQ after the page read operation. In this case, among the memory devices connected to the corresponding input/output pad DQ and receiving the first status read command 70h, the first memory device (or control logic of the first memory device) performing a previous page read operation may output status information SDATA1 of the first memory device to the input/output pad DQ in response to a read enable signal (for example, the read enable signal may be a low signal) received through the RE #pad.

Figure 6:
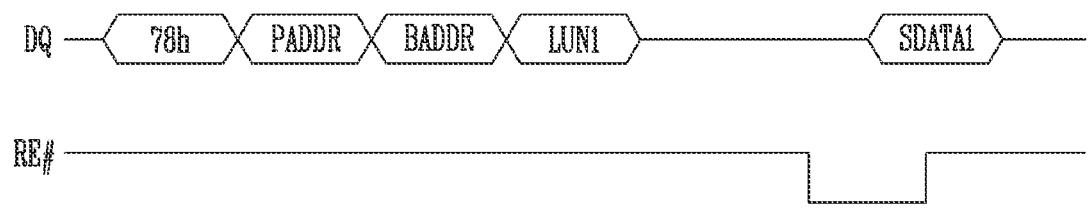
FIG. 6 is a waveform diagram illustrating the operation between the memory controller and the memory device to describe the status read command according to an embodiment different from that of FIG. 5.

FIG. 6 is a waveform diagram illustrating the operation between the memory controller and the memory device to describe the status read command according to an embodiment different from that of FIG. 5.

As shown in FIG. 1, when the plurality of memory device groups 1300 are connected to the memory controller 1200, the memory controller 1200 may issue the status read command by explicitly selecting the memory device 1100 to read the status information among the memory devices 1100 included in the memory device groups 1300.

Referring to FIG. 6, the memory controller 1200 may transmit a second status read command 78h to the memory devices together with addresses PADDR, BADDR, and LUN1 through the input/output pad DQ. For example, the addresses may include a page address PADDR of a first memory device, a block address BADDR of the first memory device, and a unique address LUN1 of the first memory device.

In this case, among the plurality of memory devices connected to the input/output pad DQ, the first memory device corresponding to the received unique address LUN1 may output status information SDATA1 of the first memory device to the input/output pad DQ in response to the read enable signal (for example, the read enable signal may be a low signal) received through the RE #pad.

Meanwhile, as shown in FIG. 6, when the status read command is used by selecting the memory device to read the status information among the plurality of memory devices, because a plurality of status read commands are required to be issued to read status information of the memory devices, there is a problem in that a speed of reading the status information is reduced.

In particular, when reading status information for all memory devices connected to a specific input/output pad DQ, because the status read commands of the number corresponding to the number of corresponding memory devices are required to be issued, the speed reduction may be the greatest. Therefore, in order to compensate for the above-described problem, status read commands according to another embodiment are described below.

Figure 7A:
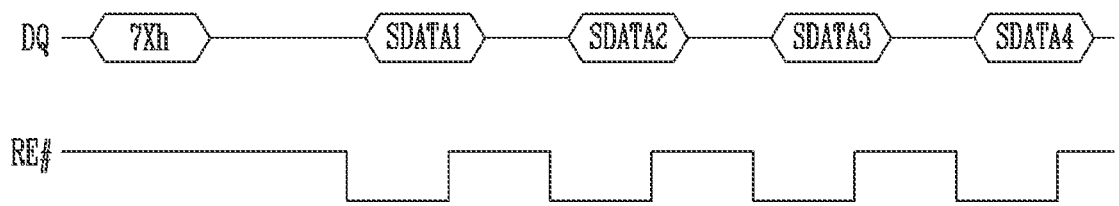
FIGS. 7A and 7B are waveform diagrams illustrating the operation between the memory controller and the memory device to describe the status read command according to an embodiment different from the status read command according to FIG. 6.
Figure 7B:
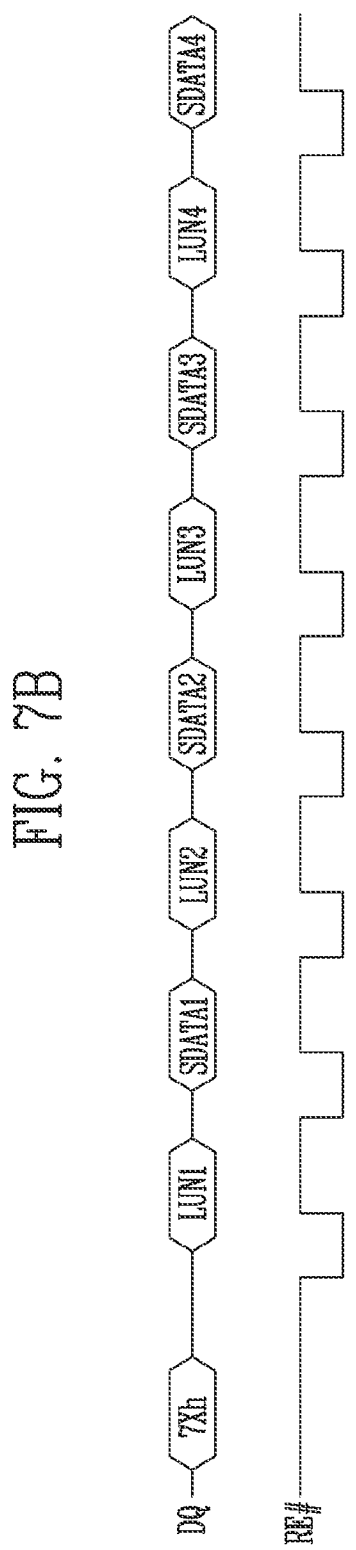

FIGS. 7A and 7B are waveform diagrams illustrating the operation between the memory controller and the memory device to describe the status read command according to an embodiment different from the status read command according to FIG. 6.

Referring to FIG. 7A, the memory controller 1200 may issue a third status read command 7Xh through the input/output pad DQ. Each of the status output controllers included in the plurality of memory devices connected to the input/output pad DQ and receiving the third status read command 7Xh may start counting the number of toggles CTN of the read enable signal. In addition, when the counted number of toggles CTN is equal to the reference number of toggles, a corresponding memory device may output own (its) status information to the input/output pad DQ.

For example, when the counted number of toggles CTN is equal to the reference toggle number 1, the status output controller of a first memory device may output status information SDATA1 stored in the status register of the first memory device to the memory controller 1200 through the input/output pad DQ.

In the similar method, when the counted number of toggles CTN is equal to the reference toggle number 2, the status output controller of a second memory device may output status information SDATA2 stored in the status register of the second memory device to the memory controller 1200 through the input/output pad DQ. When the counted number of toggles CTN is equal to the reference toggle number 3, the status output controller of a third memory device may output status information SDATA3 stored in the status register of the third memory device to the memory controller 1200 through the input/output pad DQ. When the counted number of toggles CTN is equal to the reference toggle number 4, the status output controller of a fourth memory device may output status information SDATA4 stored in the status register of the fourth memory device to the memory controller 1200 through the input/output pad DQ.

When the memory devices output the status information to the memory controller 1200 through the input/output pad DQ, the memory devices may output their unique addresses LUN1 to LUN4 together. In this case, there is an advantage in that the memory controller 1200 may grasp the status information for which memory device more easily through the unique address.

For example, when the counted number of toggles CTN is equal to the reference number of toggles 1, the status output controller of the first memory device may output the unique address LUN1 of the first memory device. When the counted number of toggles CTN is equal to 2 (or when the counted number of toggles CTN increases by one than the reference number of toggles), the status output controller of the first memory device may output the status information SDATA1 stored in the status register to the memory controller 1200 through the input/output pad DQ.

Similarly, when the counted number of toggles CTN is equal to the reference number of toggles 3, the status output controller of the second memory device may output the unique address LUN2 of the second memory device. When the counted number of toggles CTN is equal to 4 (or when the counted number of toggles CTN increases by one than the reference number of toggles), the status output controller of the second memory device may output the status information SDATA2 stored in the status register to the memory controller 1200 through the input/output pad DQ. When the counted number of toggles CTN is equal to the reference number of toggles 5, the status output controller of the third memory device may output the unique address LUN3 of the third memory device. When the counted number of toggles CTN is equal to 6 (or when the counted number of toggles CTN increases by one more than the reference number of toggles), the status output controller of the third memory device may output the status information SDATA3 stored in the status register to the memory controller 1200 through the input/output pad DQ. When the counted number of toggles CTN is equal to the reference number of toggles 7, the status output controller of the fourth memory device may output the unique address LUN4 of the fourth memory device. When the counted number of toggles CTN is equal to 8 (or when the counted number of toggles CTN increases by one more than the reference number of toggles), the status output controller of the fourth memory device may output the status information SDATA4 stored in the status register to the memory controller 1200 through the input/output pad DQ.

When using the third status read command 7Xh according to FIGS. 7A and 7B described above, when one status read command is issued through the input/output pad DQ, all memory devices connected to the corresponding input/output pad DQ sequentially provide their status information to the memory controller 1200 through the input/output pad DQ. Therefore, the status information of all memory devices may be read by issuing a single status read command, and thus the speed of reading the status information may be improved.

Figure 8A:
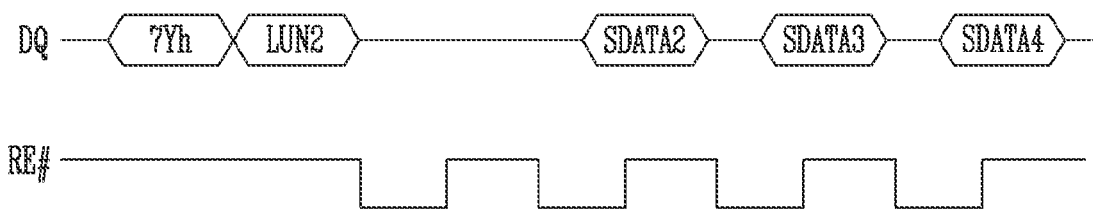
FIGS. 8A and 8B are waveform diagrams illustrating the operation between the memory controller and the memory device to describe the status read command according to an embodiment different from the status read command according to FIGS. 7A and 7B.
Figure 8B:
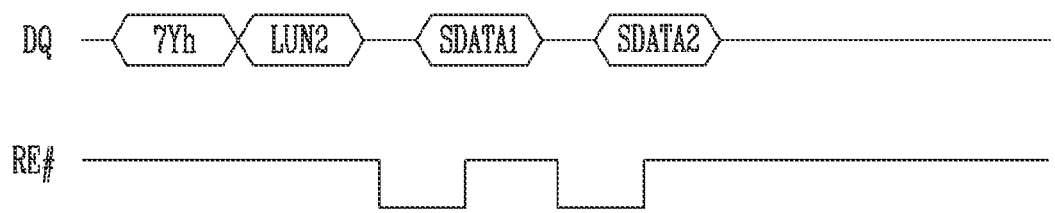

FIGS. 8A and 8B are waveform diagrams illustrating the operation between the memory controller and the memory device to describe the status read command according to an embodiment different from the status read command according to FIGS. 7A and 7B.

When using the third status read command 7Xh according to FIGS. 7A to 7B, the read status information of all memory devices connected to one input/output pad DQ may be read, but reading the status information of some memory devices is difficult.

In FIGS. 8A and 8B, the memory controller 1200 may issue a fourth status read command 7Yh through the input/output pad DQ together with a unique address of one of the memory devices connected to the input/output pad DQ. For example, the memory controller 1200 may issue the fourth status read command 7Yh and the unique address LUN2 of the second memory device to the input/output pad DQ. At this time, in FIGS. 8A and 8B, it is assumed that the unique addresses of the respective memory devices are allocated in a gradually increasing direction from the first memory device to the fourth memory device, but the present disclosure is not limited thereto. Therefore, a size comparison between the unique addresses described below should be interpreted as an example and may vary according to implementation.

Each of the status output controllers included in the plurality of memory devices connected to the input/output pad DQ and receiving the fourth status read command 7Yh and the unique address LUN2 of the second memory device may compare the unique address LUN2 received through the input/output pad DQ with own unique address obtained through the setting register.

First, referring to FIG. 8A, as a result of comparing the unique address LUN2 received through the input/output pad DQ with the own address obtained through the setting register, when the own address is greater than or equal to the second address LUN2, the state output controllers having such a unique address may start counting the number of toggles CTN of the read enable signal. In addition, when the counted number of toggles CTN is equal to the reference number of toggles, the corresponding memory device may output own status information to the input/output pad DQ. At this time, the status output controllers of which own address is less than the second address LUN2 might not perform the status information read operation.

For example, because the unique address LUN1 obtained from the setting register is less than the unique address LUN2 of the second memory device received through the input/output pad DQ, the status output controller of the first memory device may end the status information read operation without counting the number of toggles CTN of the read enable signal or outputting the status information.

The unique address LUN2 obtained from the setting register may be the same as the unique address LUN2 of the second memory device received through the input/output pad DQ. Therefore, the status output controller of the second memory device may count the number of toggles CTN of the read enable signal, and when the number of toggles CTN is equal to the reference number of toggles 2, the status output controller of the second memory device may output own status information SDATA2 to the memory controller 1200.

In the same method, the unique addresses LUN3 and LUN4 of the third memory device and the fourth memory device may be greater than the unique addresses LUN2 of the second memory device received through the input/output pad DQ. Therefore, the status output controller of the third memory device may count the number of toggles CTN of the read enable signal, and when the number of toggles CTN is equal to the reference number of toggles 3, the status output controller of the third memory device may output own status information SDATA3 to the memory controller 1200. In addition, the status output controller of the fourth memory device may count the number of toggles CTN of the read enable signal, and when the number of toggles CTN is equal to the reference number of toggles 4, the status output controller of the fourth memory device may output own status information SDATA4 to the memory controller 1200.

In contrast to FIG. 8A, referring to FIG. 8B, as a result of comparing the unique address received through the input/output pad DQ with the own address obtained through the setting register, when the own address is less than or equal to the second address LUN2, the state output controllers having such a unique address may start counting the number of toggles CTN of the read enable signal. In addition, when the counted number of toggles CTN is equal to the reference number of toggles, the corresponding memory device may output own status information to the input/output pad DQ. At this time, the status output controllers of which own address is larger than the second address LUN2 might not perform the status information read operation.

For example, because the unique address LUN1 obtained from the setting register is less than the unique address LUN2 of the second memory device received through the input/output pad DQ, the status output controller of the first memory device may count the number of toggles CTN of the read enable signal, and when the counted number of toggles CTN is equal to the reference number of toggles 1, the status output controller of the first memory device may output own status information SDATA1 to the memory controller 1200.

The unique address LUN2 obtained from the setting register is the same as the unique address LUN2 of the second memory device received through the input/output pad DQ. Therefore, the status output controller of the second memory device may count the number of toggles CTN of the read enable signal, and when the number of toggles CTN is equal to the reference number of toggles 2, the status output controller of the second memory device may output own status information SDATA2 to the memory controller 1200.

In the same method, the unique addresses LUN3 and LUN4 of the third memory device and the fourth memory device are greater than the unique addresses LUN2 of the second memory device received through the input/output pad DQ. Therefore, the status output controllers of the third and fourth memory devices may end the status information read operation without counting the number of toggles CTN of the read enable signal or outputting the status information.

According to the above-described fourth status read command 7Yh, the status information of all memory devices less or greater than the issued unique address may be read by issuing a single status read command and the unique address to the input/output pad DQ. Therefore, the speed of reading the status information may be improved, and the status information of some memory devices of one memory group may be read.

Figure 9:
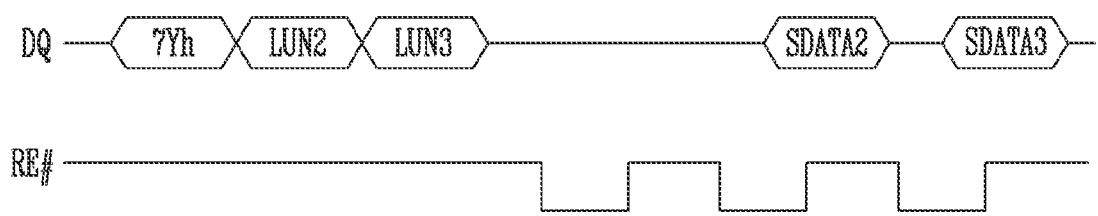
FIG. 9 is a waveform diagram illustrating the operation between the memory controller and the memory device to describe the status read command according to an embodiment different from the status read command according to FIGS. 8A and 8B.

FIG. 9 is a waveform diagram illustrating the operation between the memory controller and the memory device to describe the status read command according to an embodiment different from the status read command according to FIGS. 8A and 8B.

In FIG. 9, similarly to that in FIGS. SA to 8B, it is assumed that the unique addresses of the respective memory devices are allocated in a gradually increasing direction from the first memory device to the fourth memory device, but are not limited thereto.

Referring to FIG. 9, the memory controller 1200 may issue the fourth status read command 7Yh through the input/output pad DQ together with two unique addresses among the memory devices connected to the input/output pad DQ. For example, the memory controller 1200 may issue the fourth status read command 7Yh together with the unique address LUN2 of the second memory device and the unique address LUN3 of the third memory device to the input/output pad DQ.

Each of the status output controllers included in the plurality of memory devices connected to the input/output pad DQ and receiving the fourth status read command 7Yh together with the two unique addresses LUN2 and LUN3 may compare the two unique addresses LUN2 and LUN3 received through the input/output pad DQ with own unique address obtained through the setting register.

As a result of comparing the two unique addresses LUN2 and LUN3 received through the input/output pad DQ with the own address obtained through the setting register, when the own address is an address between the two unique addresses, the state output controllers having such a unique address may start counting the number of toggles CTN of the read enable signal. In addition, when the counted number of toggles CTN is equal to the reference number of toggles, the corresponding memory device may output own status information to the input/output pad DQ. At this time, when the own address is not an address between the two unique addresses, the state output controllers having such a unique address may end the status information read operation without counting the number of toggles CTN of the read enable signal or outputting the status information.

For example, because the unique addresses LUN1 and LUN4 obtained from the setting register do not correspond between the two unique addresses LUN2 and LUN3 received through the input/output pad DQ, the status output controllers of the first memory device and the fourth memory device may end the status information read operation without counting the number of toggles CTN of the read enable signal or outputting the status information.

Regarding the status output controllers of the second to third memory devices, because the unique address LUN2 or LUN3 obtained from the setting register corresponds between the two unique addresses LUN2 and LUN3 received through the input/output pad DQ, the status output controller of the second memory device may count the number of toggles CTN of the read enable signal, and when the number of toggles CTN is equal to the reference number of toggles 2, the second memory device may output own status information SDATA2 to the input/output pad DQ. In addition, the status output controller of the third memory device may count the number of toggles CTN of the read enable signal, and when the number of toggles CTN is equal to the reference number of toggles 3, the third memory device may output own status information SDATA3 to the input/output pad DQ.

According to the fourth status read command 7Yh according to FIG. 9, the status information of all memory devices having the unique address between the two issued unique addresses may be sequentially read by only issuing one status read command and the two unique addresses to the input/output pad DQ. Therefore, the speed of reading the status information may be improved, and the status information of some memory devices of one memory group may be read.

FIG. 10 is a flowchart illustrating a method of operating the memory device according to an embodiment. FIG. 11 is a flowchart supplementing the operation method according to FIG. 10.

Referring to FIG. 10, the method of operating the memory device may include receiving a status read command from a memory controller (S100), counting the number of toggles of a signal received from the memory controller in response to the status read command (S110), determining whether the counted number of toggles corresponds to a preset reference number of toggles (S120), and outputting status information of the memory device stored in a status register to the memory controller, in response to the determination (S130).

The signal may be a read enable signal instructing the memory device to transmit data to the memory controller.

Outputting the status information to the memory controller (S130) may include controlling the status register to transmit the status information to the memory controller when the counted number of toggles is equal to the reference number of toggles.

Outputting the status information to the memory controller (S130) may include outputting a unique address, which is individually allocated to each memory device, together with the status information to the memory controller.

Receiving the status read command (S100) may include receiving the status read command together with at least one unique address.

Meanwhile, referring to FIG. 11, the method of operating the memory device may further include comparing a unique address stored in a setting register with the at least one unique address (S102), after receiving the status read command.

When a comparison result according to comparing (S102) corresponds to a preset status output condition (S104), determining (S120) may be performed. However, when the comparison result according to comparing (S102) does not correspond to the preset status output condition (S104), determining (S120) and outputting the status information to the memory controller (S130) might not be performed.

An example of the preset status output condition is as follows.

For example, the at least one unique address may include a first unique address.

Determining (S120) may be performed when the unique address stored in the setting register is greater than or equal to the first unique address.

Alternatively, determining (S120) may be performed when the unique address stored in the setting register is less than or equal to the first unique address.

For example, the at least one unique address may include a first unique address and a second unique address.

Determining (S120) may be performed when the unique address stored in the setting register is an address between the first unique address and the second unique address.

Figure 12:
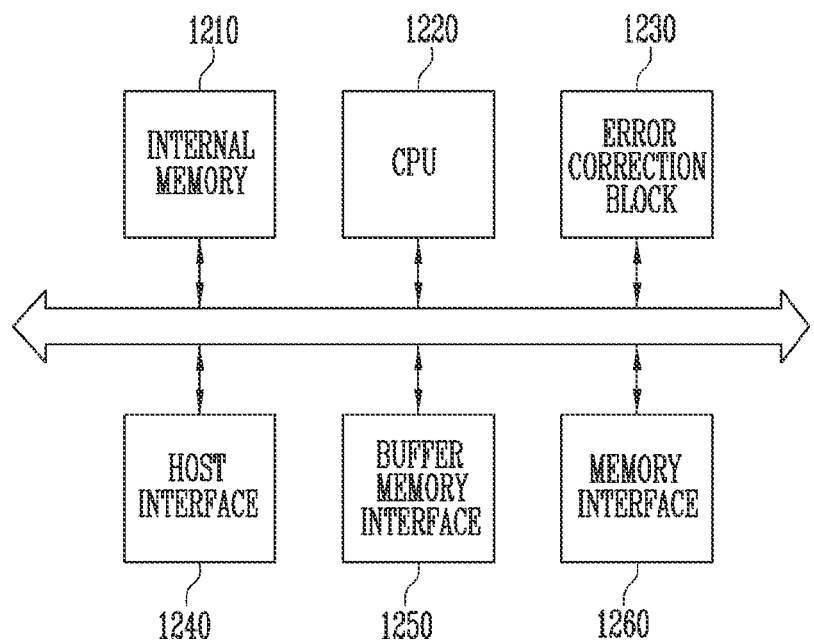
FIG. 12 is a diagram for specifically describing the memory controller of FIG. 1.

FIG. 12 is a diagram for specifically describing the memory controller of FIG. 1.

Referring to FIG. 12, the memory controller 1200 may include an internal memory 1210, a central processing unit (CPU) 1220, an error correction block 1230, a host interface 1240, a buffer memory interface 1250, and a memory interface 1260.

The internal memory 1210 may store information necessary for an operation of the memory controller 1200. For example, the internal memory 1210 may include logical and physical address map tables. The internal memory 1210 may be configured to include at least one of random access memory (RAM), dynamic RAM (DRAM), static RAM (SRAM), cache memory, and tightly coupled memory (TCM).

The CPU 1220 may perform various operations for controlling the memory device 1100 or generate various commands. When the CPU 1220 receives a request from the host 2000, the CPU 1220 may generate a command according to the received request and transmit the generated command to the error correction block 1230.

The error correction block 1230 is configured to detect and correct an error of data received from the memory device 1100 using an error correction code (ECC). The CPU 1220 may control the memory device 1100 to adjust a read voltage according to an error detection result of the error correction block 1230 and perform re-reading. As an embodiment, the error correction block may be provided as a component of the memory controller 1200.

The host interface 1240 may exchange a command, an address, and data between the memory controller 1200 and the host 2000. For example, the host interface 1240 may receive the request, the address, and the data from the host 2000 and output data read from the memory device 1100 to the host 2000. The host interface 1240 may communicate with the host 2000 using a protocol such as peripheral component interconnect express (PCIe), advanced technology attachment (ATA), serial ATA (SATA), parallel ATA (DATA), serial attached SCSI (SAS) or non-volatile memory express (NVMe). The host interface 1240 is not limited to the above-described example, and may include various interfaces such as universal serial bus (USB), multi-media card (MMC), enhanced small disk interface (ESDI), or integrated drive electronics (IDE).

The buffer memory interface 1250 may transmit data between the CPU 1220 and a buffer memory (not shown) of the memory system 1000. The buffer memory (not shown) may be used as an operation memory or a cache memory of the memory controller 1200, and may store system data used in the memory system 1000 in addition to the above-described information. According to an embodiment, the buffer memory (not shown) may include double data rate synchronous dynamic random access memory (DDR SDRAM), DDR4 SDRAM, low power double data rate4 (LPDDR4) SDRAM, graphics double data rate (GDDR) SDRAM, low power DDR (LPDDR), or Rambus dynamic random access memory (RDRAM). When the buffer memory is included in the memory controller 1200, the buffer memory interface 1250 may be omitted.

The memory interface 1260 may exchange the command, the address, and the data between the memory controller 1200 and the memory device 1100. For example, the memory interface 1260 may transmit the command, the address, and the data to the memory device 1100 through a channel, and may receive the data and the like from the memory device 1100.

Figure 13:
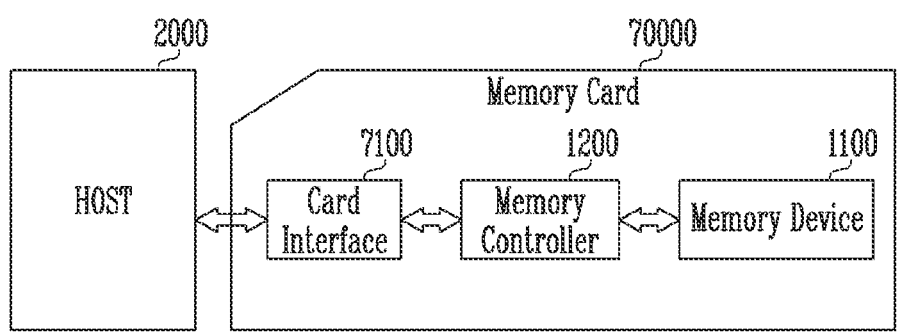
FIG. 13 is a diagram for describing another embodiment of the memory system according to FIG.

FIG. 13 is a diagram for describing another embodiment of the memory system according to FIG. 1.

Referring to FIG. 13, a memory system may include the host 2000 and a memory card 70000.

The memory card 70000 may be implemented as a smart card. The memory card 70000 may include the memory device 1100, the memory controller 1200, and a card interface 7100.

The memory controller 1200 may control data exchange between the memory device 1100 and the card interface 7100. According to an embodiment, the card interface 7100 may be a secure digital (SD) card interface or a multi-media card (MMC) interface, but is not limited thereto. In addition, the card interface 7100 may interface data exchange between the host 2000 and the memory controller 1200 according to a protocol of the host 2000. According to an embodiment, the card interface 7100 may support a universal serial bus (USB) protocol, and an interchip (IC)-USB protocol. Here, the card interface 7100 may refer to hardware capable of supporting a protocol that is used by the host 2000, software installed in the hardware, or a signal transmission method.

What is claimed is:

1. A memory device comprising:
a toggle counter configured to count a number of toggles of a read enable signal received from a memory controller, wherein the read enable signal indicates a timing of outputting status information to the memory controller;
a status register configured to store the status information of the memory device; and
a status output controller configured to control the status register to output the status information to the memory controller when the number of toggles of the read enable signal reaches a reference number of toggles,
wherein the reference number of toggles represents an order of outputting the status information among a plurality of memory devices commonly coupled to the memory controller to the memory device.

2. The memory device of claim 1, wherein the status information includes information on at least one of whether write protection is activated, whether a memory array of the memory device is in an active status, and whether an operation according to a command received before receiving a status read command has failed.

3. The memory device of claim 1, wherein the read enable signal instructs the memory device to transmit data to the memory controller.

4. The memory device of claim 1, wherein, when the counted number of toggles is equal to the reference number of toggles, the status output controller controls the status register to transmit the status information to the memory controller.

5. The memory device of claim 4, further comprising:
a setting register configured to provide the status output controller with a unique address stored in the setting register and allocated to the memory device by the memory controller.

6. The memory device of claim 5, wherein the reference number of toggles is determined based on the unique address.

7. The memory device of claim 5, wherein the status output controller is configured to transmit the status information including the unique address to the memory controller.

8. The memory device of claim 5, wherein the status output controller is configured to receive a status read command including at least one unique address.

9. The memory device of claim 8, wherein the status output controller is configured to compare the unique address stored in the setting register with the at least one unique address, and is configured to determine whether the number of toggles reaches the reference number of toggles according to a comparison result.

10. The memory device of claim 9, wherein the at least one unique address includes a first unique address, and
the status output controller is configured to determine whether the number of toggles corresponds to the reference number of toggles when the unique address stored in the setting register is greater than or equal to the first unique address.

11. The memory device of claim 9, wherein the at least one unique address includes a first unique address, and
the status output controller is configured to determine whether the number of toggles corresponds to the reference number of toggles when the unique address stored in the setting register is less than or equal to the first unique address.

12. The memory device of claim 9, wherein the at least one unique address includes a first unique address and a second unique address, and
the status output controller is configured to determine whether the number of toggles corresponds to the reference number of toggles when the unique address stored in the setting register is an address between the first unique address and the second unique address.

13. A method of operating a memory device controlled by a memory controller, the method comprising:
receiving a status read command requesting status information stored in the memory device from the memory controller;
receiving a read enable signal indicating a timing to output the status information as a response to the status read command from the memory controller;
counting a number of toggles of the read enable signal; and
outputting the status information to the memory controller when the number of toggles of the read enable signal reaches a preset reference number of toggles.

14. The method of claim 13, wherein the read enable signal instructs the memory device to transmit data to the memory controller.

15. The method of claim 13, wherein outputting the status information to the memory controller comprises controlling the status register to transmit the status information to the memory controller when the counted number of toggles is equal to the preset reference number of toggles.

16. The method of claim 13, wherein outputting the status information comprises outputting the status information including a unique address allocated to the memory device by the memory controller to the memory controller.

17. The method of claim 13, wherein receiving the status read command comprises receiving the status read command including at least one unique address from the memory controller.

18. The method of claim 17, further comprising:
comparing a unique address stored in a setting register with the at least one unique address, after the receiving the status read command.

19. The method of claim 18, wherein the at least one unique address includes a first unique address, and
wherein the determining is performed when the unique address stored in the setting register is greater than or equal to the first unique address.

20. The method of claim 18, wherein the at least one unique address includes a first unique address and a second unique address, and
wherein the determining is performed when the unique address stored in the setting register is an address between the first unique address and the second unique address.

* * * * *